US011967089B2

(12) United States Patent
Wang et al.

(10) Patent No.: US 11,967,089 B2
(45) Date of Patent: Apr. 23, 2024

(54) OBJECT TRACKING METHOD, TRACKING PROCESSING METHOD, CORRESPONDING APPARATUS, AND ELECTRONIC DEVICE

(71) Applicant: Tencent Technology (Shenzhen) Company Limited, Shenzhen (CN)

(72) Inventors: Yitong Wang, Shenzhen (CN); Jun Huang, Shenzhen (CN); Xing Ji, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 512 days.

(21) Appl. No.: 17/335,910

(22) Filed: Jun. 1, 2021

(65) Prior Publication Data

US 2021/0287381 A1 Sep. 16, 2021

Related U.S. Application Data

(63) Continuation of application No. PCT/CN2020/082043, filed on Mar. 30, 2020.

(30) Foreign Application Priority Data

Apr. 18, 2019 (CN) .......................... 201910314829.1

(51) Int. Cl.
G06T 7/246 (2017.01)
G06T 7/73 (2017.01)
(52) U.S. Cl.
CPC .............. *G06T 7/248* (2017.01); *G06T 7/73* (2017.01); *G06T 2207/10016* (2013.01)
(58) Field of Classification Search
CPC .. G06T 7/248; G06T 7/73; G06T 2207/10016
(Continued)

(56) References Cited

U.S. PATENT DOCUMENTS 10,082,554 B1    9/2018  de la Broise et al.

FOREIGN PATENT DOCUMENTS

CN    105374050 A    3/2016
CN    106683121 A    5/2017
(Continued)

OTHER PUBLICATIONS

Tencent Technology, ISR, PCT/CN2020/082043, Jun. 29, 2020, 2 pgs.

(Continued)

*Primary Examiner* — Mark Roz
(74) *Attorney, Agent, or Firm* — Morgan, Lewis & Bockius LLP

(57) ABSTRACT

Embodiments of this application provide an object tracking method performed by a computer device. The method includes, when a target object is lost in a second image frame in a first subsequent image frames, determining, according to a first local feature and in second subsequent image frames starting with the second image frame, a third image frame in which the target object reappears after the target object is lost during the tracking; determining a location of a target object region in the third image frame including the target object; and continuing to track the target object in image frames according to the location of the target object region in the third image frame. Through the object tracking method, a lost object can be detected and repositioned by using an extracted first local feature of the target object, thereby effectively resolving the problem in the existing technical solution.

20 Claims, 6 Drawing Sheets

(58) Field of Classification Search
USPC .......................................................... 382/103
See application file for complete search history.

(56) References Cited

FOREIGN PATENT DOCUMENTS

| CN | 108198201 A |   | 6/2018  |
|----|-------------|---|---------|
| CN | 109003290 A | * | 12/2018 |
| CN | 109003290 A |   | 12/2018 |
| CN | 110060276 A |   | 7/2019  |

OTHER PUBLICATIONS

Tencent Technology, WO, PCT/CN2020/082043, Jun. 29, 2020, 5 pgs.
Tencent Technology, IPRP, PCT/CN2020/082043, Sep. 28, 2021, 6 pgs.

* cited by examiner

OBJECT TRACKING METHOD, TRACKING PROCESSING METHOD, CORRESPONDING APPARATUS, AND ELECTRONIC DEVICE

CROSS-REFERENCE TO RELATED APPLICATIONS

This application is a continuation application of PCT Patent Application No. PCT/CN2020/082043, entitled "OBJECT TRACKING METHOD, TRACKING PROCESSING METHOD, CORRESPONDING APPARATUS AND ELECTRONIC DEVICE" filed on Mar. 30, 2020, which claims priority to Chinese Patent Application No. 201910314829.1, filed with the State Intellectual Property Office of the People's Republic of China on Apr. 18, 2019, and entitled "OBJECT TRACKING METHOD, TRACKING PROCESSING METHOD, CORRESPONDING APPARATUS, AND ELECTRONIC DEVICE", all of which are incorporated herein by reference in their entirety.

FIELD OF THE TECHNOLOGY

This application relates to the field of computer vision (CV) technologies, and specifically, to an object tracking method, a tracking processing method, a corresponding apparatus, and an electronic device.

BACKGROUND OF THE DISCLOSURE

Object tracking is a hot research topic in the field of CV technologies. A basic procedure of object tracking is as follows: for a real-time video stream, an initial tracking box is given in a frame to frame an object, and the tracking box is continuously updated in each following frame, so as to keep following the object. Object tracking technologies play an important role in application scenarios such as security and video editing.

SUMMARY

An embodiment of this application provides an object tracking method, including:
  extracting a first local feature of a target object in an initial target object region of a first image frame in a video stream;
  tracking the target object in first subsequent image frames after the first image frame in the video stream; and
  performing the following operations when the target object is lost in a second image frame in the first subsequent image frames during the tracking:
  determining, according to the first local feature and in second subsequent image frames starting with the second image frame, a third image frame in which the target object reappears for the first time after the target object is lost during the tracking; and
  determining a location of a target object region in the third image frame including the target object; and
  continuing to track the target object in image frames after the third image frame according to the location of the target object region in the third image frame.

An embodiment of this application further provides a tracking processing method, including:
  determining location information of a target object in each image frame of a video stream, the location information being determined by using the object tracking method; and processing the target object according to the location information correspondingly.

An embodiment of this application provides an object tracking apparatus, including:
  an extraction module, configured to extract a first local feature of a target object in an initial target object region of a first image frame in a video stream;
  an object tracking module, configured to track the target object in first subsequent image frames after the first image frame in the video stream; and
  an object retracking module, configured to perform the following operations when the target object is lost in a second image frame in the first subsequent image frames during the tracking:
  determining, according to the first local feature and in second subsequent image frames starting with the second image frame, a third image frame in which the target object reappears for the first time after the target object is lost during the tracking; and
  determining a location of a target object region in the third image frame including the target object; and
  continuing to track the target object in image frames after the third image frame according to the location of the target object region in the third image frame.

An embodiment of this application further provides a tracking processing apparatus, including:
  a determining module, configured to determine location information of a target object in each image frame of a video stream, the location information being determined by using the object tracking method; and
  a processing module, configured to process the target object according to the location information correspondingly.

An embodiment of this application provides a computer device, including:
  a processor and a memory, the memory storing at least one program, the at least one program being loaded and executed by the processor to implement the object tracking method according to the embodiments of this application.

An embodiment of this application provides a computer device, including:
  a processor and a memory, the memory storing at least one program, the at least one program being loaded and executed by the processor to implement the tracking processing method according to the embodiments of this application.

An embodiment of this application provides a non-transitory computer-readable storage medium, the computer storage medium being configured to store a plurality of programs, the programs, when being executed by a processor of a computer device, causing the computer device to perform the object tracking method according to the embodiments of this application.

An embodiment of this application provides a non-transitory computer-readable storage medium, the computer storage medium being configured to store a plurality of programs, the programs, when being executed by a processor of a computer device, causing the computer device to perform the tracking processing method according to the embodiments of this application.

Through the object tracking method, the tracking processing method, the corresponding apparatus, and the electronic device provided by the embodiments of this application, when an object is lost during tracking, the lost object can be detected and repositioned by using the extracted first local feature of the target object, so as to retrack the target object.

BRIEF DESCRIPTION OF THE DRAWINGS

To describe the technical solutions in the embodiments of this application more clearly, the following briefly describes the accompanying drawings required for describing the embodiments of this application.

DESCRIPTION OF EMBODIMENTS

Figure 1A:
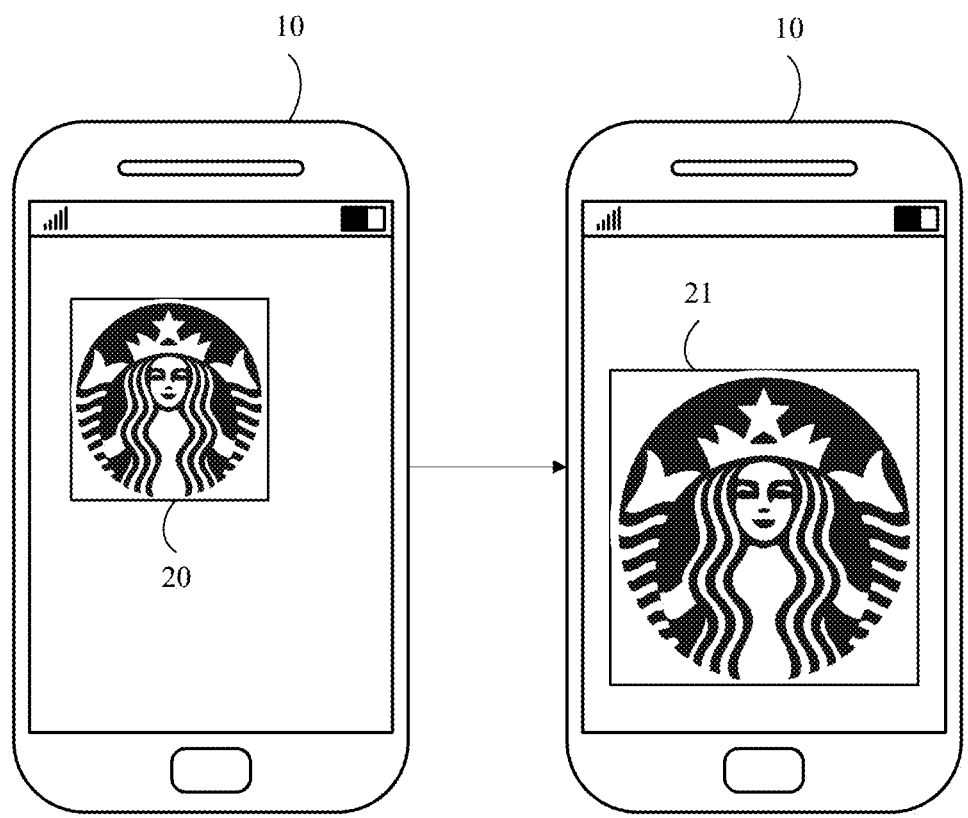
FIG. 1a is a schematic diagram of an application scenario of an object tracking method according to an embodiment of this application.

Embodiments of this application are described in detail below, and examples of the embodiments are shown in accompanying drawings, where the same or similar elements or the elements having same or similar functions are denoted by the same or similar reference numerals throughout the description. The embodiments that are described below with reference to the accompanying drawings are exemplary, and are only used to interpret this application and cannot be construed as a limitation to this application.

The singular forms "a", "an", and "the" used herein may include the plural forms as well, unless the context clearly indicates otherwise. It is to be further understood that, the terms "include" and/or "comprise" used in this specification of this application refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of units and all combinations of one or more related listed items.

In an existing object tracking method, when an object is lost during tracking (for example, leaving a visible horizon of a camera) and returns later, it is difficult to continue to track the object by using the existing solution. Therefore, the embodiments of this application provide a corresponding object tracking method and an object tracking apparatus, and when the object is lost during tracking and returns later, the object may be retracked successfully.

To make the objectives, technical solutions, and advantages of this application clearer, the following further describes implementations of this application in detail with reference to the drawings.

FIG. 1a is a schematic diagram of an application scenario of an object tracking method according to an embodiment of this application. The object tracking method is performed by a computer device (or an electronic device) 10, and the method is described below in detail. The computer device 10 may be, for example, a mobile terminal, including a mobile phone, a smart phone, a tablet computer, a notebook computer, a personal digital assistant (PDA), a portable media player (PMP), a navigation apparatus, a wearable device, or the like. Alternatively, the computer device 100 may further be a fixed terminal, for example, a digital television, a desktop computer, or a server. The computer device 10 is provided with, for example, a video surveillance application, a short video application, a video editing application, and the like, and an object in a video is tracked in the application. A result of the tracking may be marked with a box. For example, a box 20 in the left figure in FIG. 1a may be a to-be-tracked target object region marked by a user in an image frame in a video, or a to-be-tracked target object region determined in another manner. The right figure shows a tracking result of the target object in another image frame in the video according to the marked to-be-tracked target object region by using an application on the computer device 10 and the result is marked by using a box 21.

Figure 1B:
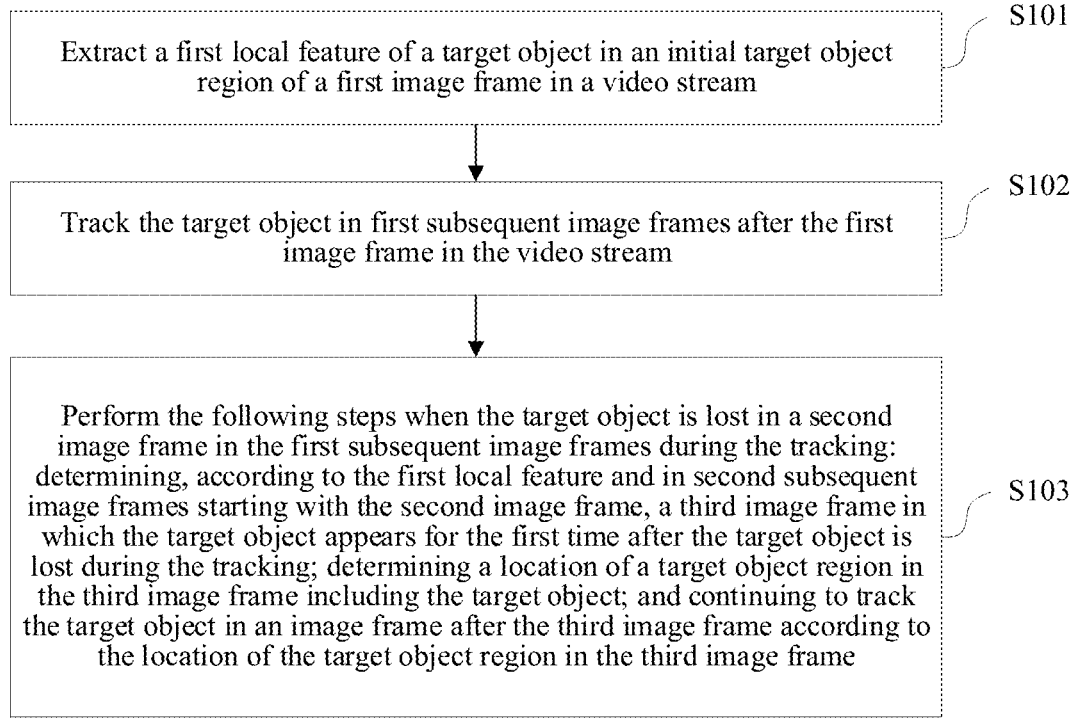
FIG. 1b is a schematic flowchart of an object tracking method according to an embodiment of this application.

As shown in FIG. 1b, an embodiment of this application provides an object tracking method, including the following steps:

Step S101. Extract a first local feature of a target object in an initial target object region of a first image frame in a video stream.

Step S102. (which may also be referred to as an object tracking step): Track the target object in first subsequent image frames after the first image frame in the video stream according to a location of the initial target object region in the first image frame.

Step S103: Perform the following steps when the target object is lost in a second image frame in the first subsequent image frames during the tracking:

Step S1031. Determine, according to the first local feature and in second subsequent image frames starting with the second image frame, a third image frame in which the target object appears for the first time after the target object is lost during the tracking.

Step S1032. Determine a location of a target object region in the third image frame including the target object.

Step S1033. Continue to track the target object in image frames after the third image frame according to the location of the target object region in the third image frame.

Through the object tracking method provided in this embodiment of this application, when an object is lost during tracking, the lost object can be detected and repositioned by using the extracted first local feature of the target object, so as to retrack the target object, thereby effectively resolving the problem in the existing technical solution that it is difficult to continue to track the object when the object is lost during tracking.

In this embodiment of this application, a type of the video stream is not specifically limited. In an example, the video stream may be real-time video stream data, such as data acquired in real time by using a video acquisition device in a video surveillance system, or historical video stream data, such as locally stored video stream data, or data downloaded from the Internet or video stream data received from another device.

In this embodiment of this application, the target object region is a region in which the target object in an image is located, that is, a target object mark. For the convenience of description, a tracking box is used for representing the target object region in the following description. For example, the initial target object region is an initial tracking box, that is, the target object region in the first image frame in which the target object is located in the video stream when tracking of the target object is started.

In this embodiment of this application, the first image frame, the initial tracking box (initial target object region), and/or the target object may be specified by a user or determined according to a predetermined algorithm. For example, after the video stream starts to be played on a computer device, the user may frame a tracking box (corresponding to the initial tracking box) including the target object by touching a screen or using an input device (such as a mouse) in a frame of the video stream (corresponding to the first image frame) displayed on the screen of the computer device, so as to allow the computer device to track the target object in the video stream. The initial tracking box may be rectangular, circular, or the like. In another example, by identifying a specific object in the video stream, and determining, by using a predetermined algorithm, a tracking box (corresponding to an initial tracking box) in a video frame (corresponding to a first image frame) in which the specific object appears for the first time, the specific object may be used as the target object to be tracked. The first image frame may be an image frame in the first place of the video stream, or may be any image frame other than the image frame in the first place. For ease of description, in the following description of the embodiments of this application, the first image frame may be described as a $K^{th}$ frame. The target object refers to a recognizable object in an image frame, for example, a vehicle, a human face, a building, or the sky. In the embodiments of this application, these contents are not specifically limited.

In step S101 of this embodiment of this application, for the first image frame (the $K^{th}$ frame) in which the initial tracking box is located in the video stream, the first local feature of the target object in the initial tracking box needs to be extracted. The extracted local feature refers to some invariant and different features corresponding to the target object. The extracted local feature may be described by using a local feature descriptor. In the embodiments of this application, the local feature descriptor that may be used includes, but is not limited to, an Oriented FAST and Rotated BRIEF (ORB) local feature descriptor, a Speed Up Robust Features (SURF) local feature descriptor, a scale invariant feature transform (SIFT) local feature descriptor, or the like. That is, the first local feature may be any one of the following: an ORB local feature, a SURF local feature, and a SIFT local feature.

In the embodiments of this application, the extracted first local feature may be cached in advance, to be used at least once in step S103.

In step S102 in this embodiment of this application, that is, in the object tracking step, the target object is tracked in first subsequent image frames after the first image frame in the video stream according to the location of the initial target object region (the initial tracking box) in the first image frame.

The first subsequent image frames refer to subsequent image frames starting from a next image frame of the first image frame (a $(K+1)^{th}$ frame to a $(K+N)^{th}$ frame, $N \geq 2$).

In this embodiment of this application, the target object may be tracked in the first subsequent image frames after the first image frame in the video stream by using a predetermined tracking algorithm. The predetermined tracking algorithm may be a correlation filter algorithm. Compared with a solution based on a convolutional neural network (CNN) which is dependent on a highly complex CNN model and thus results in poor real-time performance, and compared with an optical flow-based solution having low accuracy, the correlation filter algorithm can achieve a compromise between performance and speed.

In this embodiment of this application, an implementation of the object tracking step is described by using an example in which a kernelized correlation filter (KCF) algorithm is used as the predetermined tracking algorithm. Specifically, the target object is tracked in the first subsequent image frames after the first image frame in the video stream by using the KCF algorithm. A basic idea of the KCF algorithm is to update and calculate a location of the tracking box in a current frame for each of a plurality of first subsequent image frames based on the tracking box outputted from a previous frame (which is the initial tracking box for the first time) by using the KCF, and at the same time, accelerate calculation by using an operation of transforming from a time domain to a frequency domain, which can make the tracking process quick and accurate.

Specifically, with reference to the first image frame (the $K^{th}$ frame) and the location of the initial tracking box in the first image frame, positive and negative samples are collected to train a classifier (regressor) for the target object. In each frame (corresponding to any image frame in the first subsequent image frames), a location of the tracking box in the previous frame is expanded to obtain an expanded range, the expanded range including a plurality of sliding windows having the same size as the tracking box. A response value of each sliding window is calculated by using a trained classifier (regressor), and a response value of a sliding window with the largest response value is determined. When the response value is large enough, the sliding window is used as a result of the tracking (that is, an updated tracking box is determined). The computer device collects the positive and negative samples based on a location of the updated tracking box and the image to update the classifier (regressor) for performing a similar process in a next frame, so as to track the target object.

In this embodiment of this application, a sequence of performing step S101 and step S102 is not limited, for example, the step S101 and step S102 are performed simultaneously or performed separately, which may be set according to an actual situation.

In step S103 in this embodiment of this application, step S1031 to step S1033 are performed when the target object is lost in the second image frame in the first subsequent image frames during the tracking.

The second image frame refers to an image frame in which the object is lost for the first time during a continuous tracking process in the first subsequent image frames, and may be any one of the $(K+1)^{th}$ frame to the $(K+N)^{th}$ frame. For ease of description, an example in which the second image frame is the $(K+N)^{th}$ frame is used in the following.

In this embodiment of this application, a tracking state of the target object in an image frame includes tracking successful or tracking lost. For example, a tracking state in the second image frame is tracking lost, and a tracking state in a previous image frame of the second image frame is tracking successful. A tracking state of the target object in the first subsequent image frames may be determined in the following manner.

Description is made by using each current frame as a fourth image frame. For the fourth image frame in the first subsequent image frames, according to a location of the target object region in a previous image frame of the fourth image frame, a target response value for the target object region in the previous image frame is determined in the fourth image frame. For example, for the fourth image frame in the first subsequent image frames, according to a location of the tracking box in the previous image frame of the fourth image frame, a target response value for the tracking box in the previous image frame is determined in the fourth image frame.

Based on the above, during the tracking in the current frame, a location of the tracking box in the previous frame is expanded to obtain an expanded range, the expanded range including a plurality of sliding windows having the same size as the tracking box. A response value of each sliding window is calculated by using the trained classifier (regressor), a sliding window with the largest response value is determined, and the response value of the sliding window is used as a target response value. When the target response value is large enough, it is determined that the object is not lost during the tracking. In this case, the sliding window may be used as a result of the tracking in the current frame (that is, an updated tracking box is determined). In this embodiment of this application, when the target response value of the sliding window with the largest response value is excessively small, it is determined that the object is lost during the tracking. Specifically, it may be determined, according to a specified third threshold, whether the target response value is large enough or excessively small. When the target response value is not greater than the third threshold, it is determined that the target object is lost during the tracking in the fourth image frame. In a case that the target response value is greater than the third threshold, it is determined that the target object is tracked successfully in the fourth image frame. A tracking state in each image frame in the first subsequent image frames may be determined by using the processing method for the fourth image frame. That is, the fourth image frame may be any image frame in the first subsequent image frames.

In step S1031 in this embodiment of this application, according to the first local feature, the third image frame in which the target object appears for the first time after the target object is lost during the tracking is determined from the second subsequent image frames starting with the second image frame.

The second subsequent image frames refer to subsequent image frames starting with the second image frame (a $(K+N)^{th}$ frame to a $(K+N+M)^{th}$ frame).

The third image frame refers to an image frame in which the target object is detected again for the first time in the second subsequent image frames after the target object is lost during the tracking.

In an actual application, starting from the second image frame, it is detected whether the target object exists frame by frame in the second subsequent image frames. The detection continues until the target object is detected in the third image frame.

In this embodiment in this application, step S1031 may be implemented in the following manner.

Starting from the second image frame in the second subsequent image frames, the following operations are repeated for the second subsequent image frames: extracting a second local feature in an image frame, and matching the second local feature with the first local feature to obtain a matching result, until the matching result indicates a matching success, an image frame corresponding to the successful matching being the third image frame.

That is, for each image frame from the second image frame to the third image frame, the second local feature is extracted in an entire image, and the second local feature is matched with the first local feature. Because there is no target feature in any image frame before the third image frame, the second local feature extracted fails to be matched with the first local feature. The second local feature extracted from the third image frame succeeds in matching with the first local feature, it is determined that the target object exists in the third image frame.

In step S1032 in this embodiment of this application, the location of the target object region in which the target object is located in the third image frame is determined based on the location of the initial target object region in the first image frame. Then in step S1033, the tracking of the target object continues in image frames after the third image frame according to the location of the target object region in the third image frame.

In this embodiment of this application, the location of the target object region in which the target object is located in the third image frame may be determined based on the location of the initial target object region in the first image frame. The location of the target object region in the third image frame is used as a new target object region, and the third image frame is used as a new first image frame to continue to perform the object tracking step. The process is similar to the processing procedure in step S102. The target object is tracked in third subsequent image frames after the third image frame in the video stream according to a location of a new tracking box in the third image frame by using a predetermined tracking algorithm. Further, when the target object is lost again during the tracking, a process similar to step S103 may be performed again. The foregoing processes are cyclically performed until a tracking stop instruction from a user is received or the playing of the video stream is finished.

A process of extracting a local feature and performing matching based on local features to search for the target object again is introduced in the following by using an example in which the extracted local feature is an ORB feature.

From the foregoing descriptions, it can be learned that the extraction of the local feature mainly occurs in two stages. One is a stage of calibrating an initial tracking box for the first time. At this stage, it only needs to extract a plurality of ORB local features (corresponding to the first local feature) in the initial tracking box, and at the same time, coordinates of each of the ORB local features in an original image (the first image frame) and coordinates of the upper left corner and the lower right corner of the initial tracking box in the original image (that is, a location of the initial tracking box in the first image frame) need to be recorded. The initial tracking box is rectangular, and therefore, the location of the initial tracking box may be determined by using the coordinates of the upper left corner and the lower right corner of the initial tracking box in the original image. The location of the initial tracking box may be determined by using another method, for example, selecting other two corners or selecting four corners. The initial tracking box may be in another shape such as a circle. In this case, the location of the initial tracking box may be obtained by using the center and the radius of the circular tracking box. Another stage is that ORB local features (corresponding to the second local feature) need to be extracted in an entire image of a specific image frame after the object is lost during tracking.

Specifically, the extraction of the ORB features includes two processes of feature point detection and feature point description.

Figure 2:
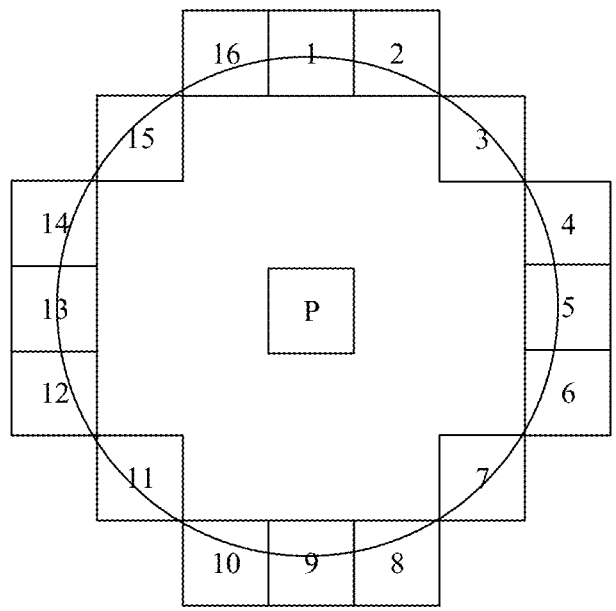
FIG. 2 is a schematic diagram of feature point detection according to an embodiment of this application.

Feature point detection: in an ORB feature extraction method, an improved FAST algorithm is used for detecting a location of a key point (that is, a feature point or an angular point). As shown in FIG. 2, a specific calculation process is as follows:

1. selecting a pixel P in an image, and recording a gray value of the pixel P as $I_p$;
2. drawing a circle by using a location of the pixel P as a center of the circle and three pixels as a radius, and recording gray values ($I_i$, $1 \le i \le 16$) of 16 pixels corresponding to the circle, where the 16 pixels intersect the circle or the 16 pixels are pixels on the circle, and the radius of the circle may alternatively be a value greater than or less than three pixels;
3. setting a proper threshold t, where when an absolute value of a difference between $I_i$ and $I_p$ is greater than t, it is determined that a pixel corresponding to $I_i$ is different from the pixel P; and
4. checking whether four pixels at locations of 1, 9, 5, and 13 (that is, four pixels on the circle that are above, below, on the left of, and on the right of the pixel P) are the same as the pixel P (whether the pixels at the locations of 1 and 9 are the same as the pixel P may be checked first, and if yes, the pixels at the locations of 5 and 13 are then checked). If at least three of the four pixels are the same as the pixel P, the pixel P is considered to be a key point.

Feature point description: In the ORB feature extraction method, an improved BRIEF algorithm is used for calculating a descriptor of a key point. A specific calculation process is as follows:

1. calculating a direction of the key point P (which may be obtained by conducting statistics on vector directions of a centroid and an origin of the key point P);
2. rotating the direction of the key point P toward a predetermined direction; and
3. selecting L point pairs or L pairs of points in a certain pattern around the rotated key point P, and combining comparison results of the L point pairs as a binarized descriptor, that is, the BRIEF descriptor, the BRIEF descriptor having rotation invariance.

Figure 3A:
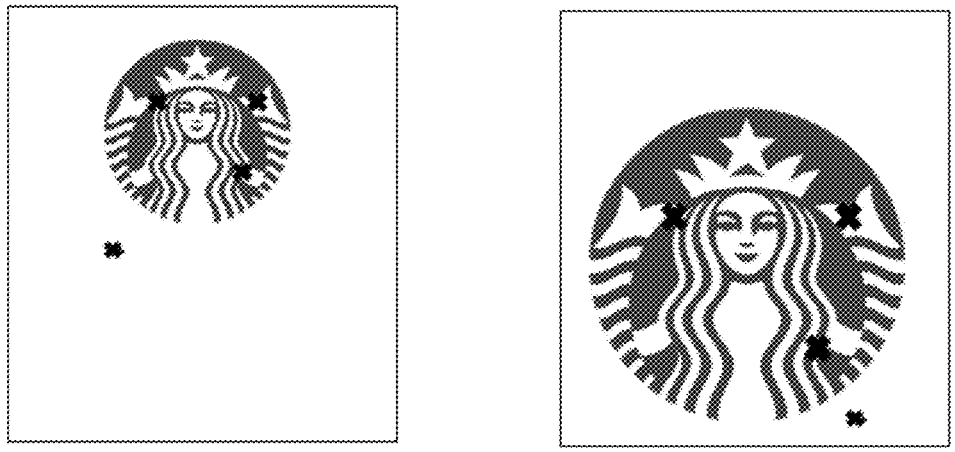
FIG. 3a is a schematic diagram 1 of re-obtaining a tracking box according to an embodiment of this application.

For example, FIG. 3a shows two images (only a target image is simply shown in the figure) including the same target object (the cartoon portrait shown in the figure). Local features of the target object are separately extracted in the two images in FIG. 3a, and results of the feature point extraction are shown by using the black symbols "x" in the figure. It can be seen from the figure that the local features of the two images are corresponding to each other.

In this embodiment of this application, after the second local feature is extracted, a process of matching the second local feature with the first local feature to obtain a matching result includes the following steps:

(1) Determine distances between each feature point in the second local feature and feature points in the first local feature.

A distance determined may include, but is not limited to, a Hamming distance, a Euclidean distance, or the like. Description is made by using a Hamming distance as an example in this embodiment of this application.

Each feature point in the extracted second local feature is compared with the feature points in the cached first local feature to calculate Hamming distances.

Figure 3B:
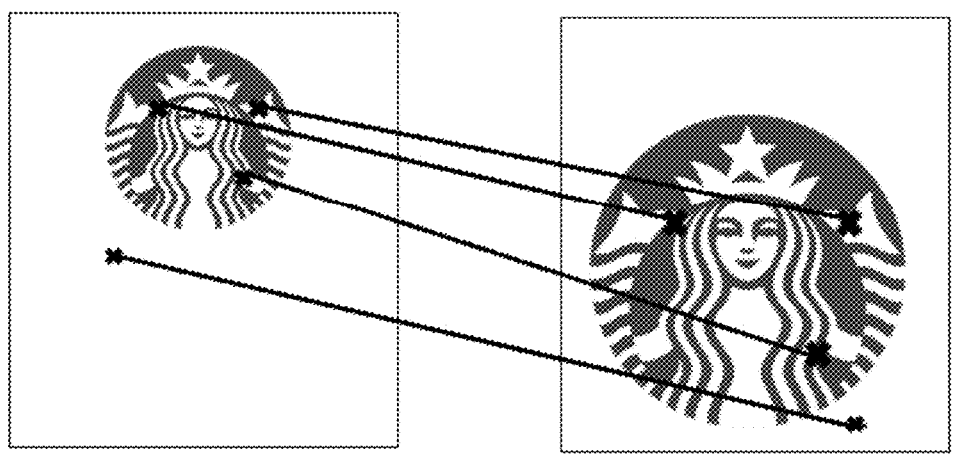
FIG. 3b is a schematic diagram 2 of re-obtaining a tracking box according to an embodiment of this application.

(2) Determine feature point matching pairs between the second local feature and the first local feature according to the distances between each feature point in the second local feature and the feature points in the first local feature. As shown in FIG. 3b, based on FIG. 3a, the feature points in the local features of the two images are matched based on similarities to obtain feature point matching pairs (which correspond to connecting lines between the left figure and the right figure in FIG. 3b, and two feature points on each connecting line are a feature point matching pair).

Specifically, for each feature point in the second local feature, a ratio of a second minimum distance to a minimum distance is determined in the distances between each feature point and the feature points in the first local feature.

For example, for a feature point A in the second local feature, a feature point C in the first local feature with a minimum Hamming distance from the feature point A and a feature point B with a second minimum Hamming distance from the feature point A are determined, a first Hamming distance between the feature point A and the feature point B is determined, a second Hamming distance between the feature point A and the feature point C is determined, and a ratio of the first Hamming distance to the second Hamming distance is calculated.

Further, for the feature point, when the ratio corresponding to the feature point is greater than a second threshold, it is determined that the feature point and a feature point in the first local feature with a minimum distance from the feature point form a feature point matching pair.

Still using the foregoing example, when the ratio of the first Hamming distance to the second Hamming distance is greater than a preset threshold (the second threshold), A and C are considered as a feature point matching pair. After the foregoing process is performed on each feature point in the second local feature, all feature point matching pairs between the second local feature and the first local feature may be obtained.

In this embodiment of this application, a matching result may be obtained directly based on all the feature point matching pairs. Alternatively, geometric calibration may be performed on all the obtained feature point matching pairs and filtered feature point matching pairs are determined, to obtain the matching result. For example, as shown in FIG. 3b, a bottom one of the four connecting lines is obviously a mismatch and may be removed by filtering.

Specifically, after a feature point matching pair is determined, if the feature point matching pair is a mismatch, the feature point matching pair is removed by filtering. In general, filtered feature point matching pairs are used as the feature point matching pairs between the second local feature and the first local feature to obtain the matching result.

After all the matching pairs are obtained, the RANSAC algorithm is used for filtering to remove mismatches. A specific calculation process is as follows:

1. Determine matching pair samples from candidate feature point matching pairs, and calculate a transformation matrix of the matching pair samples. For example, four matching pair samples are randomly selected from the candidate feature point matching pairs, a transformation matrix is calculated, and the calculated transformation matrix is denoted by M.

2. Determine a matching pair conforming to the transformation matrix in the candidate feature point matching pairs, to obtain an interior point set. That is, after a first set of data in the candidate feature point matching pairs is projected by using M, a projection error between the first set of data and a second set of data is calculated, and if the projection error of the data is less than a specified threshold, the data is added to an interior point set I.

3. Iterate feature point matching pairs in the interior point set through processes 1 and 2 to update the interior point set, that is, re-calculate a transformation matrix M by using the feature point matching pairs in the interior point set I, and calculate a projection error, until the quantity of iterations reaches a preset value.

4. Obtain a matching result according to a finally obtained interior point set, that is, the feature point matching pairs in the interior point set I are the filtered feature point matching pairs.

(3) Obtain a matching result according to a relationship between a quantity of the feature point matching pairs and a first threshold.

Specifically, when the quantity of the feature point matching pairs is greater than the first threshold, a matching result indicating a matching success is obtained. In this case, an image frame corresponding to the successful matching is the third image frame, and the target object is retracked.

In a case that the quantity of the feature point matching pairs is not greater than the first threshold, a matching result indicating a matching failure is obtained. It indicates that the second local feature may continue to be extracted in a next image frame, and the second local feature is matched with the first local feature.

In other embodiments, each feature point in the second local feature may be matched with the feature points in the first local feature based on similarities by using other methods to determine the feature point matching pairs between the second local feature and the first local feature.

In this embodiment of this application, after the second local feature in the third image frame is successfully matched with the first local feature, a location of a new tracking box in which the target object is located may be determined in the third image frame based on the location of the initial tracking box in the first image frame, so as to retrack the target object.

Specifically, a homography matrix between the third image frame and the first image frame is determined according to the feature point matching pairs, that is, a homography matrix between the two image frames is calculated according to coordinates of each feature point matching pair respectively corresponding to the first image frame and the third image frame.

Figure 3C:
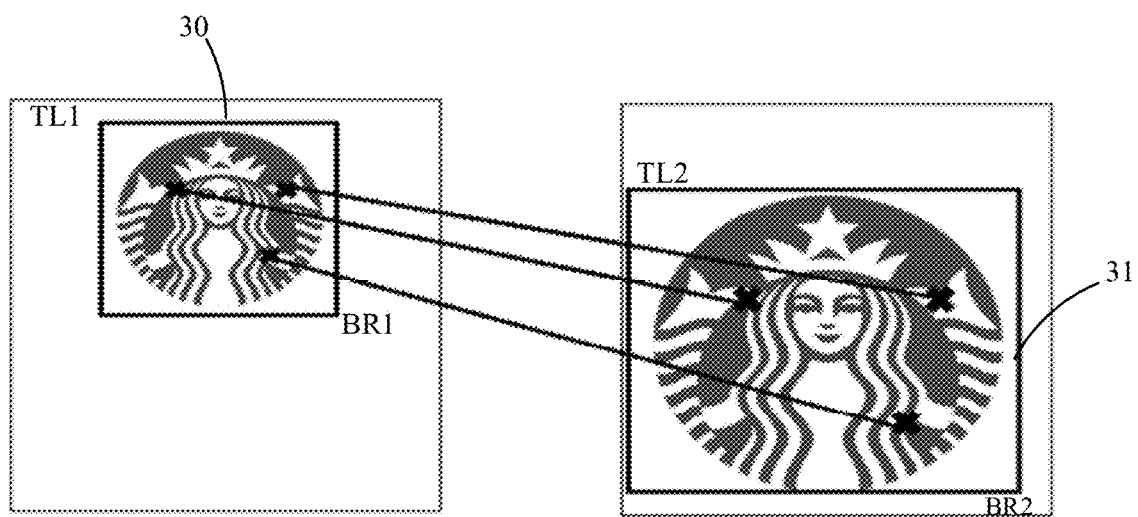
FIG. 3c is a schematic diagram 3 of re-obtaining a tracking box according to an embodiment of this application.

The location of the target object region in which the target object is located in the third image frame is determined based on the location of the initial target object region in the first image frame and the homography matrix. That is, coordinates of the upper left corner and the lower right corner of the initial tracking box are projected onto the third image frame according to the homography matrix, and coordinates of the upper left corner and the lower right corner of the new tracking box in the third image frame are obtained, that is, the location of the new tracking box in the third image frame is obtained. For example, as shown in FIG. 3c (in FIG. 3c, the homography matrix between the two images is determined based on the filtered feature point matching pairs), coordinates of the upper left corner TL2 and the lower right corner BR2 of the corresponding tracking box 31 in the right figure are obtained according to coordinates of the upper left corner TL1 and the lower right corner BR1 of the tracking box 30 in the left figure, thereby implementing the repositioning of the target object in the third image frame. Then the target object may continue to be tracked in subsequent image frames of the third image frame in the video stream according to the location of the new tracking box in the third image frame by using the predetermined tracking algorithm.

For the embodiments of this application, the foregoing method may be executed by a computer device or specifically a server, and the server may include a physical server and/or a cloud server. Specifically, the server may process a video stream in a database or a received video stream based on the method provided in the embodiments of this application, and send a tracking processing result to a terminal device for display. Alternatively, the foregoing method may be executed by a terminal device such as a mobile terminal, or executed by an application program installed on a terminal device. In an actual application, the mobile terminal may include a mobile phone, a smart phone, a tablet computer, a notebook computer, a PDA, a PMP, a navigation apparatus, or the like. In addition to elements particularly used for mobile purposes, a construction according to an implementation of this application can also be applied to a terminal of a fixed type such as a digital television or a desktop computer.

In an actual application, the foregoing predetermined tracking algorithm may be a Lucas-Kanade (LK) optical flow method, which implements the positioning of the tracking box by calculating optical flow feature points for matching. Alternatively, an object tracking algorithm based on correlation filters may be used, which has the characteristics of a high speed and high accuracy, or an object tracking algorithm based on a CNN may be used, which can achieve a desirable effect in various scenarios.

In the foregoing object tracking solutions, the solution based on a CNN needs to be dependent on a highly complex CNN model, and the solution based on the LK optical flow has low accuracy. Therefore, in combination with the tracking method based on correlation filters, an embodiment of this application further provides a solution of determining a tracking parameter of a predetermined tracking algorithm according to a device type, to adapt to greatly different computing capacities of different devices. Description is made below by using an example in which the predetermined tracking algorithm is a KCF algorithm.

In a feasible implementation, before the foregoing embodiments are performed, or before step S102 is performed, it is necessary to read device information, including but not limited to at least one of a device type, a device model, and device configuration information.

A KCF parameter is determined according to the device information. A KCF algorithm is initialized according to the KCF parameter, so as to track a target object by using the KCF algorithm.

Specifically, a device level may be determined according to the device information. The KCF parameter is determined according to the device level.

Relevant parameters that affect a speed of the KCF include the selection of features and the selection of filter kernels. The speed and accuracy of KCF tracking under different parameter configurations are different. The higher the speed, the lower the accuracy. In this embodiment of this application, the determined KCF parameters include a KCF feature and a filter kernel.

A histogram of oriented gradients (HOG) feature is determined as the KCF feature and a Gaussian kernel is determined as the filter kernel if the device level is a first level. In this case, the tracking effect is the best, and a configuration requirement is high.

A grayscale pixel is determined as the KCF feature and a Gaussian kernel as the filter kernel if the device level is a second level. In this case, the tracking effect is at a medium level, and a configuration requirement is also at a medium level.

A grayscale pixel is determined as the KCF feature and a linear kernel as the filter kernel if the device level is a third level. In this case, the tracking effect is the worst, but a configuration requirement is low and the speed is the highest.

A device at the first level outperforms a device at the second level, and a device at the second level outperforms a device at the third level.

For ease of description, a device at the first level is referred to as a high-end model, a device at the second level is referred to as a mid-end model, and a device at the third level is referred to as a low-end model.

In this embodiment of this application, the device level is determined according to a preset mapping table and the device information. The preset mapping table includes various correspondences between various device information and various device levels. In an example, if the device information is a central processing unit (CPU) main frequency, a device with a CPU main frequency>2 GHz may be defined as a high-end model, and a device with a CPU main frequency of 1.5 GHz<CPU main frequency<2 GHz may be defined as a mid-end model, and a device with a CPU main frequency<1.5 GHz is defined as low-end model.

In another feasible implementation, before the foregoing embodiments are performed, or before step S102 is performed, the KCF parameter is determined from specified candidate KCF parameters according to test frame rates corresponding to the candidate KCF parameters, and the KCF algorithm is initialized according to the KCF parameter, so as to track the target object by using the KCF algorithm.

That is, by running three types of candidate KCF parameters in real time and dynamically calculating the frame rates, suitable KCF parameters of the device are tested. In an example, the HOG feature is first selected as the KCF feature, and the Gaussian kernel is selected as the filter kernel. In this case, if the test frame rate is greater than 30 FPS, the current KCF parameters are used as the KCF parameters; otherwise, the KCF feature is set to be the grayscale pixel (adjusting the size of a tracking box to a fixed size and graying the tracking box), and the Gaussian kernel is selected as the filter kernel, and in this case, if the test frame rate is greater than 30 FPS, the current KCF parameters are used as the KCF parameters; otherwise, the KCF feature is set to be the grayscale pixel, and the linear kernel is selected as the filter kernel, which are used as the KCF parameters.

In this embodiment of this application, by adopting different tracking algorithm parameters for different devices, the foregoing method may be run on different devices in a scalable and adaptive manner, thereby achieving good adaptation and compatibility effects.

The first local feature and the second local feature merely represent local features extracted from different types of image frames and cannot be understood as a limitation to a quantity or types of local features. In an actual application, the second local feature is a local feature that is separately extracted in an entire image of one or more image frames, and the first local feature and the second local feature are local features corresponding to the same type of local feature descriptors and are matched with each other.

Similarly, the first image frame, the second image frame, the third image frame, and the fourth image frame are used for representing image frames in different progresses and situations, and cannot be understood as a limitation on an order or positions or a quantity of image frames. In an actual application, the first image frame, the second image frame, the third image frame, and the fourth image frame may be consecutive image frames in a video stream, or may include interval image frames, or may be overlapping image frames. The second image frame and the third image frame may not appear in the video stream or may appear once or for a plurality of times. After the second image frame and the third image frame appear for the first time, the second image frame and the third image may appear again, and the second image frame and the fourth image frame may be the same image frame.

Similarly, the first threshold, the second threshold, and the third threshold represent thresholds set in different situations and cannot be understood as a limitation on a value of a threshold.

Figure 4:
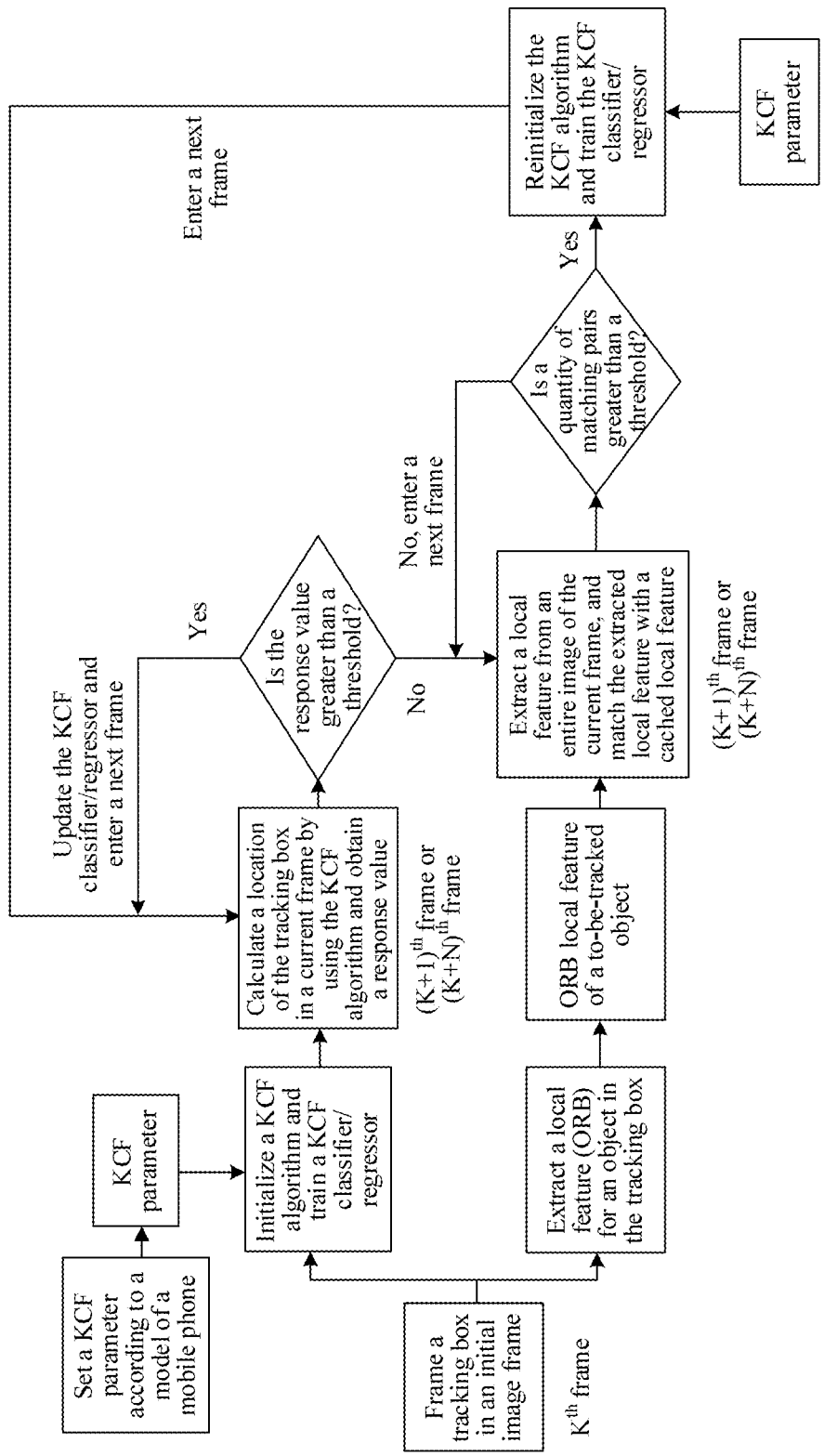
FIG. 4 is a schematic flowchart of object tracking according to an embodiment of this application.

To more clearly describe the solutions in the embodiments of this application, the solutions in the embodiments of this application are described in detail below with reference to a specific example. Specifically, in the example, the object tracking method is performed by a smart phone. FIG. 4 is a schematic flowchart of an object tracking method in this example. Object tracking may be understood as tracing a track of the object, including a continuous tracking process and retracking when the object is lost during tracking. Specifically, the procedure is described as follows. A sequence of performing steps is not limited, and is subject to a process sequence used in practice.

1. Read a model of a corresponding device (in FIG. 4, a mobile phone is used as an example) when an application on the device is started, determine a device level (high-end model, mid-end model or low-end model) according to the model of the mobile phone, and set KCF parameters according to the device level. Reference may be made to the foregoing description for a specific setting method, and details are not repeated herein.

2. After the application on the device starts to play a real-time video stream, a user frames an initial tracking box on a certain frame (designated as a $K^{th}$ frame) displayed on the device screen, and the application starts a tracking algorithm according to the framing operation of the user: initializing a KCF algorithm according to the initial tracking box and the KCF parameters when the KCF algorithm is used, and training a subsequently used KCF classifier/regressor, to perform object tracking. At the same time, the application extracts an ORB local feature (corresponding to an ORB local feature of a to-be-tracked object in FIG. 4) for an object in the initial tracking box.

3. The KCF algorithm continuously performs, starting from a $(K+1)^{th}$ frame, correlation filtering based on a tracking box outputted from a previous frame (the initial tracking box framed by the user is used in the $K^{th}$ frame), updates and calculates a location of a new tracking box in a current frame, and returns a response value of the location of the tracking box.

4. In a case that the response value is greater than a threshold, the application considers that the tracking is successful and the object is not lost during the tracking, and continues the tracking in a next frame.

5. In a case that the response value is not greater than the threshold, the application extracts an ORB local feature in an entire image of the current frame, and matches the feature with an ORB local feature of the to-be-tracked object cached in advance.

6. In the step of matching the ORB local features, the application determines whether a quantity of matching pairs is greater than a preset threshold, and if the quantity is not greater than the preset threshold, the application considers that the object is lost during the tracking, and continuously performs, starting from the next frame, operations of extracting an ORB feature in an entire image and matching.

7. Otherwise, the application considers that the ORB feature matching is successful, calculates a homography matrix according to a result of the ORB feature matching, calculates the location of the new tracking box in the current frame according to the homography matrix, and re-initializes the KCF algorithm by using the location of the new tracking box and the KCF parameters (the previously configured KCF parameters may be obtained or the KCF parameters may be configured again) and trains a KCF classifier/regressor to perform the object tracking.

8. In this case, the object tracking returns to the state of tracking by using the KCF algorithm, until the object is lost again during the tracking (that is, a response value is less than the threshold).

In the object tracking method provided in the embodiments of this application, tracking algorithm parameters are determined according to a model of a device to implement object tracking. When an object is lost during the tracking, the lost object is detected and repositioned by matching local descriptors, so as to retrack the target object, thereby effectively resolving the problem in the existing technical solution that it is difficult to continue to track the object when the object is lost during tracking.

The object tracking method provided by the embodiments of this application may be applied to application scenarios such as security, short video, and video editing.

Specifically, an embodiment of this application further provides a tracking processing method, including the following steps:

Step S201. Determine location information of a target object in each image frame of a video stream, the location information being determined by using the tracking processing method according to any one of the foregoing embodiments.

For this embodiment of this application, a type of the video stream is not specifically limited. In an example, the video stream may be real-time video stream data, such as data acquired in real time by using an acquisition device in a video surveillance system, or historical video stream data such as stored or downloaded data.

The target object is a recognizable object in each image frame in the video stream, for example, a vehicle, a human face, a building, or the sky.

In a possible implementation, location information of the target object in an image frame may be determined according to a tracking box used in the tracking processing method.

In another possible implementation, a local feature of each image frame may be re-extracted to match with a local feature of the target object extracted in advance, so as to determine a location of the target object in each image frame. Reference may be made to the foregoing introduction for extraction and matching manners of local features, and details are not repeated herein.

Based on the foregoing embodiments, it can be learned that the object may be lost in some image frames, and in this case, the determined location information may be empty.

Step S202. Process the target object according to the location information correspondingly.

In one implementation, the processing the target object correspondingly includes at least one of the following:

(1) Determine a movement trajectory of the target object.

For example, this step may be applied to a security scenario. In this scenario, the target object is a tracked object, and a movement trajectory of the target object is a movement trajectory of the tracked object. In this embodiment of this application, the movement trajectory of the tracked object may be managed according to the location information determined by using the object tracking method.

When location information in some image frames is empty, trajectories in these image frames may be predicted according to a movement trajectory in a previous image frame and a movement trajectory in a subsequent image frame, or a segmented movement trajectory may be directly obtained.

(2) Add an associated object associated with the target object to an image frame corresponding to the location information.

For example, this step may be applied to scenarios such as a short video and video editing. In this scenario, for example, in a short video application on a mobile phone, the target object is an object photographed by a user, and the associated object associated with the target object may be a sticker, a pendant, a special effect, and the like displayed on the phone screen, or other materials. In this embodiment of this application, according to the location information determined by using the object tracking method, an effect that the associated object closely follows the object photographed by the user may be achieved, or an effect of displaying the associated object according to a specific trajectory may be achieved. Even if the location information in some image frames is empty, an effect of displaying subsequent image frames is not affected.

In the tracking processing method provided in the embodiments of this application, during the corresponding processing of the video stream, even if the object is lost during tracking, the tracking may continue, thereby achieving a complete processing effect and improving user experience effectively.

The foregoing service scenarios are merely examples. Suitable changes may be made based on the examples so that the method may be applied to other scenarios, and the changes may also fall within the spirit and scope of this application.

Figure 5:
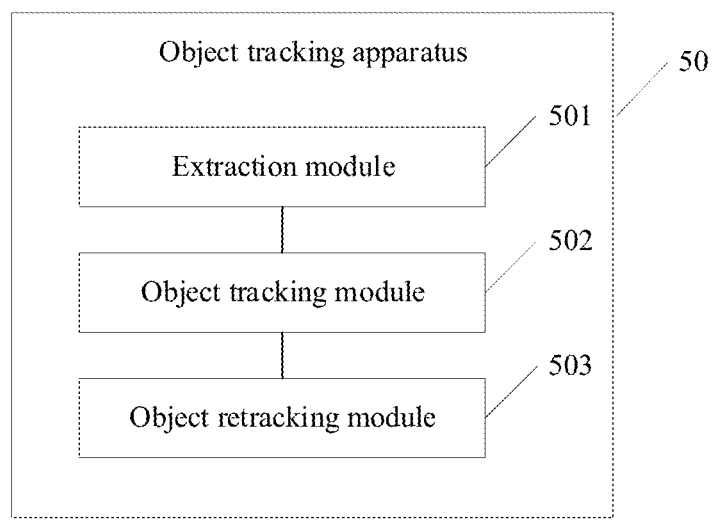
FIG. 5 is a schematic structural diagram of an object tracking apparatus according to an embodiment of this application.

An embodiment of this application further provides an object tracking apparatus. As shown in FIG. 5, an object tracking apparatus 50 may include: an extraction module 501, an object tracking module 502, and an object retracking module 503.

The extraction module 501 is configured to extract, for a first image frame in which an initial target object region is located in a video stream, a first local feature of a target object in the initial target object region.

The object tracking module 502 is configured to track the target object in first subsequent image frames after the first image frame in the video stream according to a location of the initial target object region in the first image frame.

The object retracking module 503 is configured to perform the following operations when the target object is lost in a second image frame in the first subsequent image frames during the tracking:

determining, according to the first local feature and in second subsequent image frames starting with the second image frame, a third image frame in which the target object appears for the first time after the target object is lost during the tracking; and determining, based on the location of the initial target object region in the first image frame, a location of a target object region in which the target object is located in the third image frame; and continuing to track the target object in image frames after the third image frame according to the location of the target object region in the third image frame.

In one implementation, when determining, according to the first local feature from the second subsequent image frames starting with the second image frame, the third image frame in which the target object appears for the first time after the target object is lost during the tracking, the object retracking module 503 is specifically configured to:

repeat, starting from the second image frame in the second subsequent image frames, the following operations for the second subsequent image frames: extracting a second local feature in an image frame and matching the second local feature with the first local feature to obtain a matching result, until the matching result indicates a matching success, an image frame corresponding to the successful matching being the third image frame.

In one implementation, when matching the second local feature with the first local feature to obtain a matching result, the object retracking module 503 is specifically configured to:

determine distances between each feature point in the second local feature and feature points in the first local feature;

determine feature point matching pairs between the second local feature and the first local feature according to the distances between the feature point in the second local feature and the feature points in the first local feature;

obtain, when a quantity of the feature point matching pairs is greater than a first threshold, a matching result indicating a matching success; and obtain, when the quantity of the feature point matching pairs is not greater than the first threshold, a matching result indicating a matching failure.

In one implementation, when determining feature point matching pairs between the second local feature and the first local feature according to the distances between the feature point in the second local feature and the feature points in the first local feature, the object retracking module 503 is specifically configured to:

determine, for the feature point in the second local feature, a ratio of a second minimum distance to a minimum distance in the distances between the feature point and the feature points in the first local feature; and determine, for the feature point when the ratio corresponding to the feature point is greater than a second threshold, that the feature point and a feature point in the first local feature with a minimum distance from the feature point form a feature point matching pair.

In one implementation, after determining that the feature point and a feature point in the first local feature with a minimum distance from the feature point form a feature point matching pair, the object retracking module 503 is further configured to remove a feature point matching pair through filtering when the feature point matching pair is a mismatch pair.

When determining feature point matching pairs between the second local feature and the first local feature, the object retracking module 503 is specifically configured to use feature point matching pairs after the filtering as the feature point matching pairs between the second local feature and the first local feature.

In one implementation, when determining, based on the location of the initial target object region in the first image frame, a location of a target object region in which the target object is located in the third image frame, the object retracking module 503 is specifically configured to:

determine a homography matrix between the third image frame and the first image frame according to the feature point matching pairs; and determine, based on the location of the initial target object region in the first image frame and the homography matrix, the location of the target object region in which the target object is located in the third image frame.

In one implementation, the object retracking module 503 is further configured to: determine a tracking state of the target object in the first subsequent image frames in the following manners, the tracking state including tracking successful or tracking lost:

determining, for a fourth image frame in the first subsequent image frames according to a location of the target object region in a previous image frame of the fourth image frame, a target response value in the fourth image frame for the target object region in the previous image frame;

determining that the target object is lost during the tracking in the fourth image frame when the target response value is not greater than a third threshold; and determining that the target object is tracked successfully in the fourth image frame when the target response value is greater than the third threshold.

In one implementation, when tracking the target object in the first subsequent image frames after the first image frame in the video stream, the object tracking module is specifically configured to:

track the target object in the first subsequent image frames after the first image frame in the video stream by using a KCF algorithm.

The apparatus further includes a setting module, where before the object tracking module tracks the target object in the first subsequent image frames after the first image frame in the video stream by using the KCF algorithm, the setting module is configured to:

determine a KCF parameter according to device information; and initialize the KCF algorithm according to the KCF parameter.

In one implementation, when determining the KCF parameter according to the device information, the setting module is configured to:

determine a device level according to the device information; and determine the KCF parameter according to the device level.

In one implementation, when determining the device level according to the device information, the setting module is configured to:

determine the device level according to a preset mapping table and the device information, where the preset mapping table includes various correspondences between various device information and various device levels.

In one implementation, the KCF parameter includes a KCF feature and a filter kernel. When determining the KCF parameter according to the device level, the setting module is configured to:

determine a histogram of oriented gradients (HOG) feature as the KCF feature and a Gaussian kernel as the filter kernel when the device level is a first level;

determine a grayscale pixel as the KCF feature and a Gaussian kernel as the filter kernel when the device level is a second level; or determine a grayscale pixel as the KCF feature and a linear kernel as the filter kernel when the device level is a third level, a device at the first level outperforming a device at the second level, a device at the second level outperforming a device at the third level.

In one implementation, the device information includes at least one of the following:

a device type, a device model, and device configuration information.

In one implementation, the setting model is further configured to:

determine a KCF parameter from specified candidate KCF parameters according to test frame rates corresponding to the candidate KCF parameters; and initialize the KCF algorithm according to the KCF parameter.

In one implementation, the second local feature corresponds to the first local feature, and the first local feature includes any one of the following:

an ORB local feature, a SURF local feature, and a SIFT local feature.

In the object tracking apparatus provided in this embodiment of this application, the implementation principle and the technical effect produced are the same as those of the foregoing method embodiments. For convenience and conciseness of description, for the parts not mentioned in the apparatus embodiments, refer to corresponding content in the foregoing method embodiments, and details are not repeated here.

By using the object tracking apparatus provided in the embodiments of this application, when an object is lost during tracking, the lost object can be detected and repositioned by using the extracted first local feature of the target object, so as to retrack the target object, thereby effectively resolving the problem in the existing technical solution that it is difficult to continue to track the object when the object is lost during tracking.

An embodiment of this application further provides a tracking processing apparatus. The tracking processing apparatus may include a determining module and a processing module.

The determining module is configured to determine location information of a target object in each image frame of a video stream, the location information being determined by using the method according to a first aspect or any optional implementation of the first aspect.

The processing module is configured to process the target object according to the location information correspondingly.

In one implementation, when processing the target object correspondingly, the processing module is specifically configured to perform at least one of the following:

determining a movement trajectory of the target object; and adding an associated object associated with the target object to an image frame corresponding to the location information.

In the tracking processing apparatus provided in this embodiment of this application, the implementation principle and the technical effect produced are the same as those of the foregoing method embodiments. For convenience and conciseness of description, for the parts not mentioned in the apparatus embodiments, refer to corresponding content in the foregoing method embodiments, and details are not repeated here. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

An embodiment of this application further provides an electronic device, including a processor and a memory, the memory storing at least one instruction, at least one program, a code set or an instruction set, the at least one instruction, the at least one program, the code set or the instruction set being loaded and executed by the processor to implement the corresponding content according to the foregoing method embodiments.

Optionally, the electronic device may further include a transceiver. The processor and the memory are connected, for example, are connected by using a bus. In an actual application, there may be one or more transceivers. The structure of the electronic device does not constitute a limitation on this embodiment of this application.

The processor may be a CPU, a digital signal processor (DSP), an application-specific integrated circuit (ASIC), a field programmable gate array (FPGA) or another programmable logic device, a transistor logic device, a hardware component, or any combination thereof. The processor may implement or perform various examples of logic blocks, modules, and circuits described with reference to content disclosed in the embodiments of this application. The processor may alternatively be a combination to implement a computing function, for example, may be a combination of one or more microprocessors, or a combination of a DSP and a microprocessor.

The bus may include a channel, to transmit information between the foregoing components. The bus may be a PCI bus, an EISA bus, or the like. The bus may be classified into an address bus, a data bus, a control bus, or the like. The memory may be a ROM or another type of static storage device that can store static information and a static instruction; or a RAM or another type of dynamic storage device that can store information and an instruction; or may be an EEPROM, a CD-ROM or another compact-disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto.

By using the electronic device provided in the embodiments of this application, a semantic relationship between a sequence of part of speech of natural language description information and a video feature sequence of a to-be-described video, and a decoder is provided with more feature utilization space. Compared with the related art in which only video-level visual features are used while the impact of part of speech in natural language is ignored, the embodiments of this application can generate accurate natural language description information for the to-be-described video, and improve the performance of generating video description information, thereby helping to understand and analyze the video such as video classification and retrieval, and achieving potential economic benefits.

An embodiment of this application further provides a readable storage medium, for example, a computer-readable storage medium. The computer-readable storage medium is configured to store computer instructions, the computer instructions, when run on a computer, causing the computer to perform corresponding content in the foregoing method embodiments.

Although the steps in the flowchart in the accompanying drawings are sequentially shown according to indication of an arrow, the steps are not necessarily sequentially performed according to a sequence indicated by the arrow. Unless explicitly specified in this specification, execution of the steps is not strictly limited in the sequence, and the steps may be performed in other sequences. In addition, at least some steps in the flowcharts in the accompanying drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the other step.

The foregoing descriptions are some implementations of this application. A person of ordinary skill in the art may make several improvements and refinements without departing from the principle of this application, and the improvements and refinements shall fall within the protection scope of this application.

What is claimed is:

1. An object tracking method performed by a computer device, the method comprising:
    determining a kernelized correlation filter (KCF) algorithm parameter according to device information of the computer device;
    initializing the KCF algorithm according to the KCF parameter;
    extracting a first local feature of a target object in an initial target object region of a first image frame in a video stream;
    tracking the target object in first subsequent image frames after the first image frame in the video stream by using the KCF algorithm; and
    performing the following operations when the target object is lost in a second image frame in the first subsequent image frames during the tracking:
        determining, according to the first local feature and in second subsequent image frames starting with the second image frame, a third image frame in which the target object reappears for the first time after the target object is lost during the tracking;
        determining a location of a target object region in the third image frame including the target object; and
        continuing to track the target object in image frames after the third image frame according to the location of the target object region in the third image frame.

2. The object tracking method according to claim 1, wherein the determining, according to the first local feature and in second subsequent image frames starting with the second image frame, a third image frame in which the target object reappears for the first time after the target object is lost during the tracking comprises:
    repeating, starting from the second image frame in the second subsequent image frames, the following operations for the second subsequent image frames:
        extracting a second local feature in an image frame and matching the second local feature with the first local feature to obtain a matching result, until the matching result indicates a matching success, an image frame corresponding to the successful matching being the third image frame.

3. The object tracking method according to claim 2, wherein the matching the second local feature with the first local feature to obtain a matching result comprises:
    determining distances between each feature point in the second local feature and feature points in the first local feature;
    determining feature point matching pairs between the second local feature with the first local feature according to the distances between the feature point in the second local feature and the feature points in the first local feature;
    obtaining, when a quantity of the feature point matching pairs is greater than a first threshold, a matching result indicating a matching success; and
    obtaining, when the quantity of the feature point matching pairs is not greater than the first threshold, a matching result indicating a matching failure.

4. The object tracking method according to claim 3, wherein the determining feature point matching pairs between the second local feature and the first local feature according to the distances between the feature point in the second local feature and the feature points in the first local feature comprises:
    determining, for the feature point in the second local feature, a ratio of a second minimum distance to a minimum distance in the distances between the feature point and the feature points in the first local feature; and
    determining, for the feature point when the ratio corresponding to the feature point is greater than a second threshold, that the feature point and a feature point in the first local feature with a minimum distance from the feature point form a feature point matching pair.

5. The object tracking method according to claim 3, wherein the determining a location of a target object region in the third image frame including the target object comprises:
    determining a homography matrix between the third image frame and the first image frame according to the feature point matching pairs; and
    determining, based on a location of the initial target object region in the first image frame and the homography matrix, the location of the target object region in the third image frame including the target object.

6. The object tracking method according to claim 1, further comprising determining a tracking state of the target object in the first subsequent image frames in the following manners, the tracking state being tracking successful or tracking lost:
    determining, for a fourth image frame in the first subsequent image frames according to a location of the target object region in a previous image frame of the fourth image frame, a target response value in the fourth image frame for the target object region in the previous image frame;
    determining that the target object is lost during the tracking in the fourth image frame when the target response value is not greater than a third threshold; and
    determining that the target object is tracked successfully in the fourth image frame when the target response value is greater than the third threshold.

7. The object tracking method according to claim 1, wherein the KCF parameter is selected from candidate KCF parameters according to test frame rates corresponding to the candidate KCF parameters.

8. The object tracking method according to claim 1, wherein the determining a KCF parameter according to device information comprises:
  determining a device level according to the device information; and
  determining the KCF parameter according to the device level.

9. The object tracking method according to claim 8, wherein the determining a device level according to the device information comprises:
  determining the device level according to a preset mapping table and the device information,
  the preset mapping table comprising correspondences between device information and device levels.

10. The object tracking method according to claim 9, wherein the KCF parameter comprises a KCF feature and a filter kernel, and the determining the KCF parameter according to the device level comprises:
  determining a histogram of oriented gradients (HOG) feature as the KCF feature and a Gaussian kernel as the filter kernel when the device level is a first level;
  determining a grayscale pixel as the KCF feature and a Gaussian kernel as the filter kernel when the device level is a second level; or
  determining a grayscale pixel as the KCF feature and a linear kernel as the filter kernel when the device level is a third level,
  a device at the first level outperforming a device at the second level, a device at the second level outperforming a device at the third level.

11. A computer device, comprising:
  a memory, configured to store a plurality of programs; and
  a processor, configured to perform, when executing the plurality of programs stored in the memory, a plurality of operations including:
  determining a kernelized correlation filter (KCF) algorithm parameter according to device information of the computer device;
  initializing the KCF algorithm according to the KCF parameter:
  extracting a first local feature of a target object in an initial target object region of a first image frame in a video stream;
  tracking the target object in first subsequent image frames after the first image frame in the video stream by using the KCF algorithm; and
  performing the following operations when the target object is lost in a second image frame in the first subsequent image frames during the tracking:
    determining, according to the first local feature and in second subsequent image frames starting with the second image frame, a third image frame in which the target object reappears for the first time after the target object is lost during the tracking;
    determining a location of a target object region in the third image frame including the target object; and
    continuing to track the target object in image frames after the third image frame according to the location of the target object region in the third image frame.

12. The computer device according to claim 11, wherein the determining, according to the first local feature and in second subsequent image frames starting with the second image frame, a third image frame in which the target object reappears for the first time after the target object is lost during the tracking comprises:
  repeating, starting from the second image frame in the second subsequent image frames, the following operations for the second subsequent image frames:
    extracting a second local feature in an image frame and matching the second local feature with the first local feature to obtain a matching result, until the matching result indicates a matching success, an image frame corresponding to the successful matching being the third image frame.

13. The computer device according to claim 12, wherein the matching the second local feature with the first local feature to obtain a matching result comprises:
  determining distances between each feature point in the second local feature and feature points in the first local feature;
  determining feature point matching pairs between the second local feature with the first local feature according to the distances between the feature point in the second local feature and the feature points in the first local feature;
  obtaining, when a quantity of the feature point matching pairs is greater than a first threshold, a matching result indicating a matching success; and
  obtaining, when the quantity of the feature point matching pairs is not greater than the first threshold, a matching result indicating a matching failure.

14. The computer device according to claim 13, wherein the determining feature point matching pairs between the second local feature and the first local feature according to the distances between the feature point in the second local feature and the feature points in the first local feature comprises:
  determining, for the feature point in the second local feature, a ratio of a second minimum distance to a minimum distance in the distances between the feature point and the feature points in the first local feature; and
  determining, for the feature point when the ratio corresponding to the feature point is greater than a second threshold, that the feature point and a feature point in the first local feature with a minimum distance from the feature point form a feature point matching pair.

15. The computer device according to claim 13, wherein the determining a location of a target object region in which the target object is located in the third image frame comprises:
  determining a homography matrix between the third image frame and the first image frame according to the feature point matching pairs; and
  determining, based on a location of the initial target object region in the first image frame and the homography matrix, the location of the target object region in the third image frame including the target object.

16. The computer device according to claim 11, wherein the plurality of operations further comprise determining a tracking state of the target object in the first subsequent image frames in the following manners, the tracking state being tracking successful or tracking lost:
  determining, for a fourth image frame in the first subsequent image frames according to a location of the target object region in a previous image frame of the fourth image frame, a target response value in the fourth image frame for the target object region in the previous image frame;
  determining that the target object is lost during the tracking in the fourth image frame when the target response value is not greater than a third threshold; and determining that the target object is tracked successfully in the fourth image frame when the target response value is greater than the third threshold.

17. The computer device according to claim 11, wherein the KCF parameter is selected from candidate KCF parameters according to test frame rates corresponding to the candidate KCF parameters.

18. A non-transitory computer-readable storage medium, configured to store a plurality of programs that, when executed by a processor of a computer device, cause the computer device to perform a plurality of operations including:
   determining a kernelized correlation filter (KCF) algorithm parameter according to device information of the computer device;
   initializing the KCF algorithm according to the KCF parameter;
   extracting a first local feature of a target object in an initial target object region of a first image frame in a video stream;
   tracking the target object in first subsequent image frames after the first image frame in the video stream by using the KCF algorithm; and
   performing the following operations when the target object is lost in a second image frame in the first subsequent image frames during the tracking:
      determining, according to the first local feature and in second subsequent image frames starting with the second image frame, a third image frame in which the target object reappears for the first time after the target object is lost during the tracking;
      determining a location of a target object region in the third image frame including the target object; and
      continuing to track the target object in image frames after the third image frame according to the location of the target object region in the third image frame.

19. The non-transitory computer-readable storage medium according to claim 18, wherein the determining, according to the first local feature and in second subsequent image frames starting with the second image frame, a third image frame in which the target object reappears for the first time after the target object is lost during the tracking comprises:
   repeating, starting from the second image frame in the second subsequent image frames, the following operations for the second subsequent image frames:
   extracting a second local feature in an image frame and matching the second local feature with the first local feature to obtain a matching result, until the matching result indicates a matching success, an image frame corresponding to the successful matching being the third image frame.

20. The non-transitory computer-readable storage medium according to claim 19, wherein the matching the second local feature with the first local feature to obtain a matching result comprises:
   determining distances between each feature point in the second local feature and feature points in the first local feature;
   determining feature point matching pairs between the second local feature with the first local feature according to the distances between the feature point in the second local feature and the feature points in the first local feature;
   obtaining, when a quantity of the feature point matching pairs is greater than a first threshold, a matching result indicating a matching success; and
   obtaining, when the quantity of the feature point matching pairs is not greater than the first threshold, a matching result indicating a matching failure.

* * * * *